United States Patent [19]
Morita et al.

[11] Patent Number: 5,822,509
[45] Date of Patent: Oct. 13, 1998

[54] DRAWING PROGRAM CREATING METHOD

[75] Inventors: Masao Morita; Ichiro Yamashita; Kazuto Hayashi, all of Nakai-machi, Japan

[73] Assignee: Fuji Xerox Co., Ltd., Tokyo, Japan

[21] Appl. No.: 729,370

[22] Filed: Oct. 17, 1996

[30] Foreign Application Priority Data

Dec. 7, 1995 [JP] Japan ................................ 7-345173

[51] Int. Cl.$^6$ ................................................ G06K 15/00
[52] U.S. Cl. ........................................ 395/115; 395/112
[58] Field of Search .................................. 395/115, 101, 395/112, 113, 114, 116, 701, 707, 922, 117; 707/502; 83/76.1, 76.6, 76.7, 76.8; 318/568.23; 364/148, 152, 191; 400/67

[56] References Cited

U.S. PATENT DOCUMENTS

| | | | |
|---|---|---|---|
| 5,136,688 | 8/1992 | Morikawa et al. | 395/115 |
| 5,333,246 | 7/1994 | Nagasaka . | |
| 5,353,388 | 10/1994 | Motoyama | 395/114 |

FOREIGN PATENT DOCUMENTS

A-7-104987  4/1995  Japan .

WO91/15831  10/1991  WIPO .

OTHER PUBLICATIONS

S.J. Harington, et al., "Interpress, The Source Book –The Document and Page Description Language for Performance Printing", Brady (1988), pp. 425–488.

*Primary Examiner*—Arthur G. Evans
*Attorney, Agent, or Firm*—Oliff & Berridge, PLC

[57] ABSTRACT

An apparatus and method for creating a drawing program used by a printer to print a document calculates the load on the printer for printing portions of the document, and embeds the calculated loads in the drawing program. Document data is converted into page description language commands that are used by a printer to print the document. Load parameters indicating the time and/or the memory capacity required by the printer to process each command of the page description language are stored in a memory unit. The load of the printer for each of the converted commands is calculated for each process unit of the document, which corresponds to a command string, based on the load parameters. A drawing program to be processed by the printer is then created from commands and the calculated loads.

18 Claims, 22 Drawing Sheets

```
Header   "Interpress/Xerox/3.0"
BEGIN
   {preamble 0}
   {page 1}
   {page 2}
   {page 3}
END
```

```
Header   "Interpress/Xerox/3.0"
BEGIN
   {}
   {
      Identifier "xerox"
      Identifier "XC1-1-1"
      Identifier "times"
      3 MAKEVEC
      0.00635 SCALE
      MODIFYFONT
      0 FSET
      0 SETFONT
      0.10.1 SETXY
      String "ABC"
      SHOW
      0.1 0.2 MOVETO
      0.1 0.3 LINETO
      0.2 0.3 LINETO
      0.2 0.2 LINETO
      0.1 0.2 LINETO
      MASKSTROKE
   }
END
```

```
Header  "Interpress/Xerox/3.0"
BEGIN
   {parameter list}
   {preamble 0}
   {K1 X1, K2 X2, ···}  {
      PBEGIN
         {K1 X11, K2 X12, ···}
         {PAGE ITEM 1}
      PEND
      PBEGIN
         {K1 X21, K2 X22, ···}
         {PAGE ITEM 2}
      PEND
   }
   {K1 Y1, K2 Y2, ···} {PAGE 2}
   {K1 Z1, K2 Z2, ···} {PAGE 3}
END
```

FIG.3

| NAME | FUNCTION IDENTIFIER | NUMBER OF ARGUMENTS | ARGU-MENT | | TYPE | COEFFICIENT VALUE |
|---|---|---|---|---|---|---|
| MOVETO | 1 | 1 | • → | | 1 | 0.01 |
| LINETO | 1 | 1 | • → | | 1 | 0.02 |
| CURVETO | 1 | 1 | • → | | 1 | 0.03 |
| MASKSTROKE | 2 | 2 | • → | | 2 | 0.2 → 1 | 0.2 |
| SHOW | 3 | 2 | • → | | 3 | 0.08 → 1 | 0.01 |
| MASKPIXEL | 4 | 3 | • → | | 4 | 0.1 → 5 | 0.1 → 1 | 0.2 |

FIG.5

| CLASSIFICATION ID | TYPE OF CLASSIFICATION |
|---|---|
| 0 | CONSTANT |
| 1 | COMBINING FUNCTION |
| 2 | DEFINING FUNCTION |
| 3 | ARGUMENT |
| 4 | ARGUMENT COEFFICIENT |

FIG.7

| COMBINING FUNCTION IDENTIFIER | TYPE OF FUNCTION |
|---|---|
| 1 | ADDITION |
| 2 | SUBTRACTION |
| 3 | MULTIPLICATION |
| 4 | DIVISION |
| 5 | SQUARING |
| 6 | SQUARE ROOT |
| --- | --- |

FIG.8

| ARGUMENT ID | TYPE OF ARGUMENT |
|---|---|
| 1 | CONSTANT |
| 2 | NUMBER OF PATHS |
| 3 | NUMBER OF CHARACTERS |
| 4 | SIZE OF ARRANGEMENT X |
| 5 | SIZE OF ARRANGEMENT Y |
| --- | --- |

FIG.9

```
Header  "Interpress/Xerox/3.0"
BEGIN
   {}
   {01.82}{
      PBEGIN
         {00.91}{
            0.1  0.2  MOVETO
            0.1  0.3  LINETO
            0.2  0.3  LINETO
            0.2  0.2  LINETO
            0.1  0.2  LINETO
            MASKSTROKE
         }
      PEND
      PBEGIN
         {0 0.91}{
            0.2  0.3  MOVETO
            0.2  0.4  LINETO
            0.3  0.4  LINETO
            0.3  0.3  LINETO
            0.2  0.3  LINETO
            MASKSTROKE
         }
      PEND
   }
END
```

```
Header  "Interpress/Xerox/3.0"
BEGIN
  {}
  {1 408}{
    PBEGIN
      {1 204}{
        0.1 0.2 MOVETO
        0.1 0.3 LINETO
        0.2 0.3 LINETO
        0.2 0.2 LINETO
        0.1 0.2 LINETO
        MASKSTROKE
      }
    PEND
    PBEGIN
      {1 204}{
        0.2 0.3 MOVETO
        0.2 0.4 LINETO
        0.3 0.4 LINETO
        0.3 0.3 LINETO
        0.2 0.3 LINETO
        MASKSTROKE
      }
    PEND
  }
END
```

| NAME | CLASSIFICATION |
|---|---|
| MOVETO | 1 |
| LINETO | 1 |
| CURVETO | 1 |
| MASKSTROKE | 2 |
| MASKFILL | 3 |
| SHOW | 4 |
| MASKPIXEL | 5 |

FIG.19

DRAWING PROGRAM CREATING METHOD

BACKGROUND OF THE INVENTION

1. Field of the Invention

The present invention relates to a drawing program creating system and method which creates a page of document data by means of a drawing program in accordance with the grammar of the page description language when a document is caused to be output from the printer. More particularly, the invention relates to a printer driver which creates a page description language program for the printer which processes the page description language in parallel.

2. Description of Related Art

A display is produced through a page description language program created by an application program in conjunction with a printer driver, where the description language program is printed by an output system equipped with a page description language process function. As to the composition of the output system, various formats exist. For example, as shown in FIG. 25, one in which the page description language program (PDL program) P, containing the document data, is sent from the client machine C and is printed by the output system (printer) PR of the server machine S. However, obtaining a faster output processing by accomplishing the drawing formation process in parallel with the output system PR on the basis of the page description language program P has long been the aim in the industry.

FIG. 26 shows a rough composition of an image creating system and output system such as a general DTP system which creates and successively processes page description language programs. As this drawing shows, the document image data which is to be output by the application in the image creating system (e.g., client machine) is created. Then the printer driver (or the application itself) creates the page description language program by producing a print command. The printer driver creates a spool file in order to release the application from the print process early. In some cases, the page description language is created from the spool file.

The page description language which has been created is then sent to the output process system (printer) and interpreted successively in the output process system in accordance with the grammar of the page description language before the target document image is created and output by driving the printer engine.

FIG. 27 shows a rough composition of an image creating system and output system such as a DTP system which creates and processes in parallel a page description language program such as is disclosed, for example, in international publication number WO91/15831.

In the processes used to execute the page description language program in parallel, the processes in the image creating system are the same as in the above-described successive process. However, after the successive page description language program has been pre-processed (PDL pre-process) on the output system side, the page description language program is interpreted in parallel in accordance with the grammar of the page description language, and the target document image is created and output by driving the printer engine.

As disclosed in Japanese Laid-Open Patent Publication 7-104987, a method has also been known in which the parallel process is designated by inserting a particular sentence structure into a particular phrase using a page description language having a parallel sentence structure in order to execute the page description language program in parallel.

When the page description language program is executed through parallel processing, the processing efficiency is higher than when successive processing is used, and the output process by the output system is accomplished quickly.

However, with the method in which the successive page description program is pre-processed at the time of parallel processing, it is not known which commands are executed when the page description program is not interpreted, and consequently it is difficult to predict the load on the parallel process as a whole until the pre-process is entirely completed, making it difficult to realize a suitable parallel process in accordance with the load. In addition, with the method which inserts a sentence structure at each particular phrase, the sentence structure is mechanically inserted without taking the load into consideration. Consequently, the balance of the load distribution is poor and it is difficult to realize a suitable parallel process in accordance with the load.

In addition, because the page description language program leaves only the information for maintaining the uniformity of the document data which has been input, the data portions which are in one bunch in the input document data are also divided into a plurality of portions, so that it is difficult to read the original partitioning from the page description language program. Consequently, when scheduling for execution of the parallel process, it is necessary to take into consideration the bunch of data portions in the document data being processed.

In consideration of the foregoing, it is an objective of the present invention to realize a suitable parallel process in accordance with the load without forcing the interpretation or pre-process on the printer by creating a drawing program that is supplied to the printer. The drawing program takes into consideration the load required by the printer which is the output system in the processes of the commands of the page description language.

It is another objective of the present invention to omit unnecessary pre-processes or interpretations in the printer by creating a drawing program that clearly indicates the load by accomplishing a load forecast simultaneously with the creation of the page description language, without conducting a load forecast in the printer after conversion to the page description language, by focussing on the fact that "the printer driver completely grasps both the input document data and the page description language program because the input document data is converted to page description language and then output to the printer." In addition, it is an objective of the present invention to easily realize scheduling such that the printer free time is short, using the load in the drawing program on the printer side.

SUMMARY OF THE INVENTION

In order to achieve the above objectives, the drawing program creating system according to the present invention comprises: a conversion means which converts commands into page description language on the basis of document data which has been input; a memory means which stores in memory load parameters indicating the time needed by the printer or the memory capacity needed by the printer for the process of this command for each command of the page description language; a calculation means which calculates the load of the printer at each process unit which is the corresponding command line on the basis of the load parameters stored in the memory means; and a program creation means which creates a drawing program that is processed by the printer from the commands which have been converted by the conversion means and the load which has been calculated by the calculation means.

In addition, the drawing program creating system according to the present invention comprises, as an alternative to the above-described memory means, a parameter acquiring means which acquires from the printer the above-described load parameters.

In the present invention, the fact that differing load values are indicated is sufficiently taken into account even in cases in which the same page description language program is executed by the loaded hardware, algorithms, or the like, depending on the printer, and consequently, the load parameters are defined and acquired for each printer, so that variances in the load values between printers are absorbed.

In addition, with the drawing program creating method according to the present invention, the load parameters indicating the time needed by the printer or the memory capacity needed by the printer for processing the commands are stored in memory beforehand for each command of the page description language. The commands are then converted to page description language on the basis of the document data which has been input. The load of the printer is calculated at each process unit which is the corresponding command line on the basis of the load parameters which are stored in memory corresponding to each command which has been converted. A drawing program is then created from the calculated printer load and the converted commands.

That is to say, in the present invention, when the document input data is converted into a page description language program, the load parameters are grasped for each command of the page description language, the load which is predicted for each process unit of the page description language program is calculated, and the drawing program is created and output in accordance with the grammar of the page description language from the page description language program and the calculated load values.

The drawing program in which the loads have been embedded in this manner is output to the printer. However, because the printer understands in advance the loads applied to the processes in the page description language program (drawing program), it is possible to omit useless pre-processes by using this load information, and thus speed up the output process.

In this specification, the document data which is input is document data from an editor, or the like, used in diagram drawing, and is described in each diagram element (that is to say, in each unit which is managed by the editor or the like) in numerous document data items. In addition, the drawing refers to the entire output to paper by the printer, including the drawing of diagrams, text, images and the like.

BRIEF DESCRIPTION OF THE DRAWINGS

FIG. 3 is a drawing describing the basics of the extended Interpress structure.

FIG. 5 is a drawing showing the load parameter table holding the load parameters for each command of the drawing program creating system.

FIG. 7 is a drawing showing the classification IDs and types of the function definition table of the drawing program creating system.

FIG. 8 is a drawing showing the combined function IDs and types of the drawing program creating system.

FIG. 9 is a drawing showing the argument IDs and types referenced from the load parameter table of the drawing program creating system.

FIG. 19 is a drawing showing the commands and the classification thereof of a drawing program creating system according to the third embodiment of the present invention.

DETAILED DESCRIPTION OF PREFERRED EMBODIMENTS

Figures 1, 2:
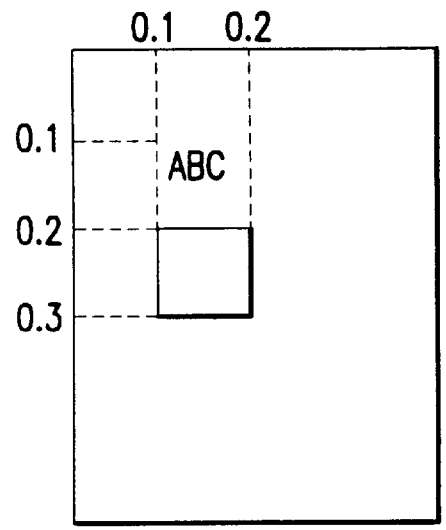
FIG. 1 is a drawing describing the basics of the Interpress structure.
FIG. 2 is a drawing showing an example of an Interpress program.

Before concretely describing the drawing program creating system and method, a description will be provided of the page description language. In the description hereafter, the description will use a page description language which is an extension of Interpress, a representative page description language.

The Interpress program has the structure shown in FIG. 1, wherein the Header indicates that this program is an Interpress program, that the type of character coding follows Xerox encoding, and that the version of Interpress is 3.0. "BEGIN" indicates the start of a block, while "END" indicates the end of the block. The portions enclosed by braces are called bodies, where it is possible to describe Interpress commands. The body following "BEGIN" is called the preamble, and herein commands used in common in the blocks are defined. The bodies following the preamble are called page bodies, and show the division of pages. In the Interpress program shown in FIG. 1, a program with 3 pages is shown.

The Interpress commands are primarily executed through the manipulation of arguments using a stack. A representative operator is as follows (for details, please refer to Harrington, S. J., Buckley, R. R.: "Interpress, The Source Book—The Document And Page Description Language for Performance Printing—", Brady (1988) (Japanese translation: "Interpress—The Page Description Language for Electronic Printing—", Maruzen (1989)

MOVETO: Creates an empty trajectory the end point of which is the coordinates of the two numbers on top of the stack.

LINETO: Adds to the trajectory a line from the end point of the trajectory to the two numbers on top of the stack. The end point of this trajectory becomes the end point of the line.

CURVETO: Adds to the trajectory a beje curve having as control points the end point of the trajectory and the three numbers on top of the stack. The end point of this trajectory becomes the end point of the beje curve.

MASKSTROKE: Draws a track along the trajectory.

MASKFILL: Paints the inside of the trajectory.

SHOW: Draws the first character string on top of the stack from the current point.

MASKPIXEL: Draws the pixel arrangement on top of the stack.

FIG. 2 shows an example of an Interpress program and the results of executing this program. In the program shown in the left portion of this figure, the first row of the program is the above-described "Header". The "BEGIN" on the second row indicates the start of the program (this block is a block of the program), and the third row indicates the preamble. The page body starts on the fourth row, with rows five through 12 making the name "[xerox, XC1-1-1, times]" and the font size 18. With rows 13 through 15, the characters "ABC" are drawn from a position the X coordinate of which is 0.1 and the Y coordinate of which is 0.1. In rows 16 through 21, a square is drawn which is 0.1 meter long on a side with (0.1, 0.2), (0.1, 0.3), (0.2, 0.3), and (0.2, 0.2) as the vertices.

The MOVETO, LINETO and CURVETO commands are commands which construct the data expressing the diagram, while the MASKSTROKE and SHOW commands are commands that give concrete expression to the diagrams which have been constructed. In the page description language, commands which have been divided into several categories can be combined to construct one diagram, and in the example shown in FIG. 2, the characters "ABC" are drawn along with the diagram of a square, as shown in the right-hand portion of the figure.

In the present embodiment, the language specifications of this Interpress are extended as follows (see FIG. 3).

(1) A load value body is provided prior to the bodies. This load value body shows the load value strings in the bodies. Numerical values can be omitted.

(2) A new block load value body is provided prior to the preamble in the block enclosed by BEGIN and END.

(3) The new block is defined by PBEGIN and PEND. This block has two bodies, the same as in (1).

(4) Inside the load value body are pairs of two numerical values, the first being a numerical value showing the category of the load value and the second numerical value showing the load value for this category.

As shown in FIG. 3, parameters which express the load values in the entire program are described in a Parameter List of the load value body provided immediately prior to the page bodies which are the process units. K1, K2, . . . , Kn are numerical values expressing the types of load value parameters, and Xn, Yn and Zn are respectively totals for load value parameters for each page. Xnn are the load value parameters in the body enclosed by PBEGIN and PEND within a page.

The reason why the load value body is entered prior to the process units is that because the page description language is an interpreter type (successive execution type), scheduling of the process units is impossible if the load values are not described prior to the process units. However, if the process units are buffered and the order of successive processing is altered somewhat, the load value bodies can also be described after the process units.

In addition, because the page description language is of the successive execution type, scheduling is easily accomplished in each page unit and it is possible to allocate load values (processes) to a plurality of printers in each page unit if the load value body is described in the page units of the program. Furthermore, if the load value body is described in the document unit of the program, scheduling is easily accomplished in each document unit and it is possible to allocate load values (processes) to a plurality of printers in each document unit.

The description of the embodiments hereafter will be provided using the Interpress commands which have been extended in this manner.

Figure 4:
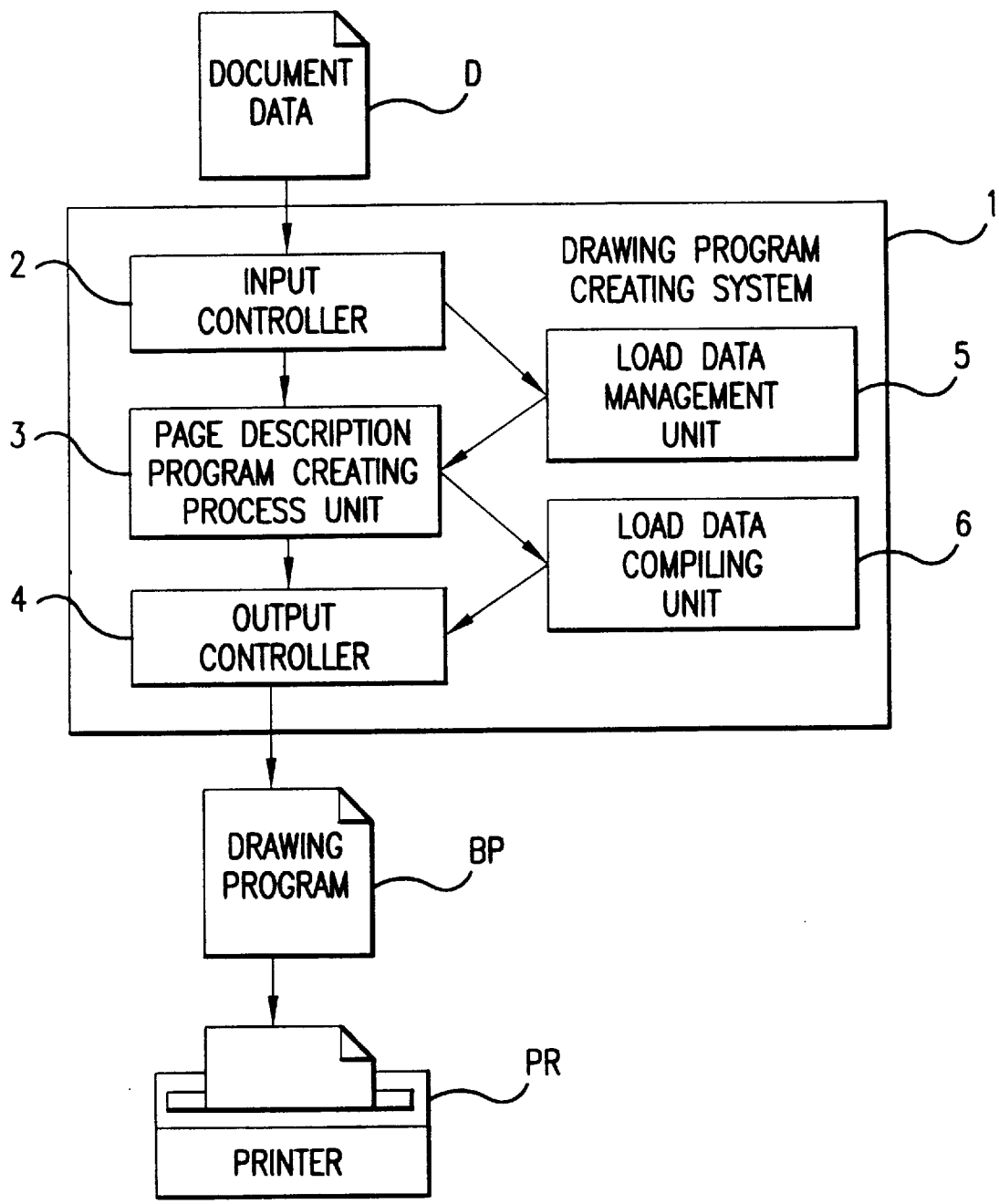
FIG. 4 is a drawing showing the composition of the major components of a drawing program creating system according to a first embodiment of the present invention.

FIG. 4 shows the composition of the major components of a drawing program creating system according to a first embodiment of the present invention.

The drawing program creating system 1 is composed in a printer driver, which includes an input controller 2, a page description program creating process unit 3, an output controller 4, a load data management unit 5, and a load data compiling unit 6.

The input controller 2 receives the input document data D and controls the flow of data. The load data management unit 5 manages the load parameters of the printer PR that is the output objective, and returns the load parameters when load parameter acquisition from the page description program creating process unit 3 is required.

The page description program creating process unit 3 creates a page description program through the various commands of the page description language from the document data D which has been input, acquires from the load data management unit 5 the load values for the commands which are contained in the program that is created, calculates the load values on the basis of the input document data D and the arguments of the created program, and delivers all of the outputs to the output controller 4. The load data compiling unit 6 maintains the load values which have been calculated by the page description program creating unit 3, and delivers the load values that are maintained when there is a request from the output controller 4. The output controller 4 maintains the program created by the page description program creating process unit 3, acquires the load values from the load data compiling unit 6 as necessary, and outputs the program to the printer PR as a drawing program BP to which the load values in the maintained program have been appended.

FIG. 5 shows the load parameters in the output system managed by the load data management unit. This figure shows one example of the load parameter management table of each command. The management table has a name field expressing the name of the command, a function identifier field which identifies the function in order to calculate the load value, an argument constant field which expresses the constant of the argument of the function in order to calculate the load value, and an argument field which maintains the types of arguments and values of the coefficients. The argument field is a variable length field, and is data expressing the argument which is the value which the argument constant field indicates.

Figure 6:
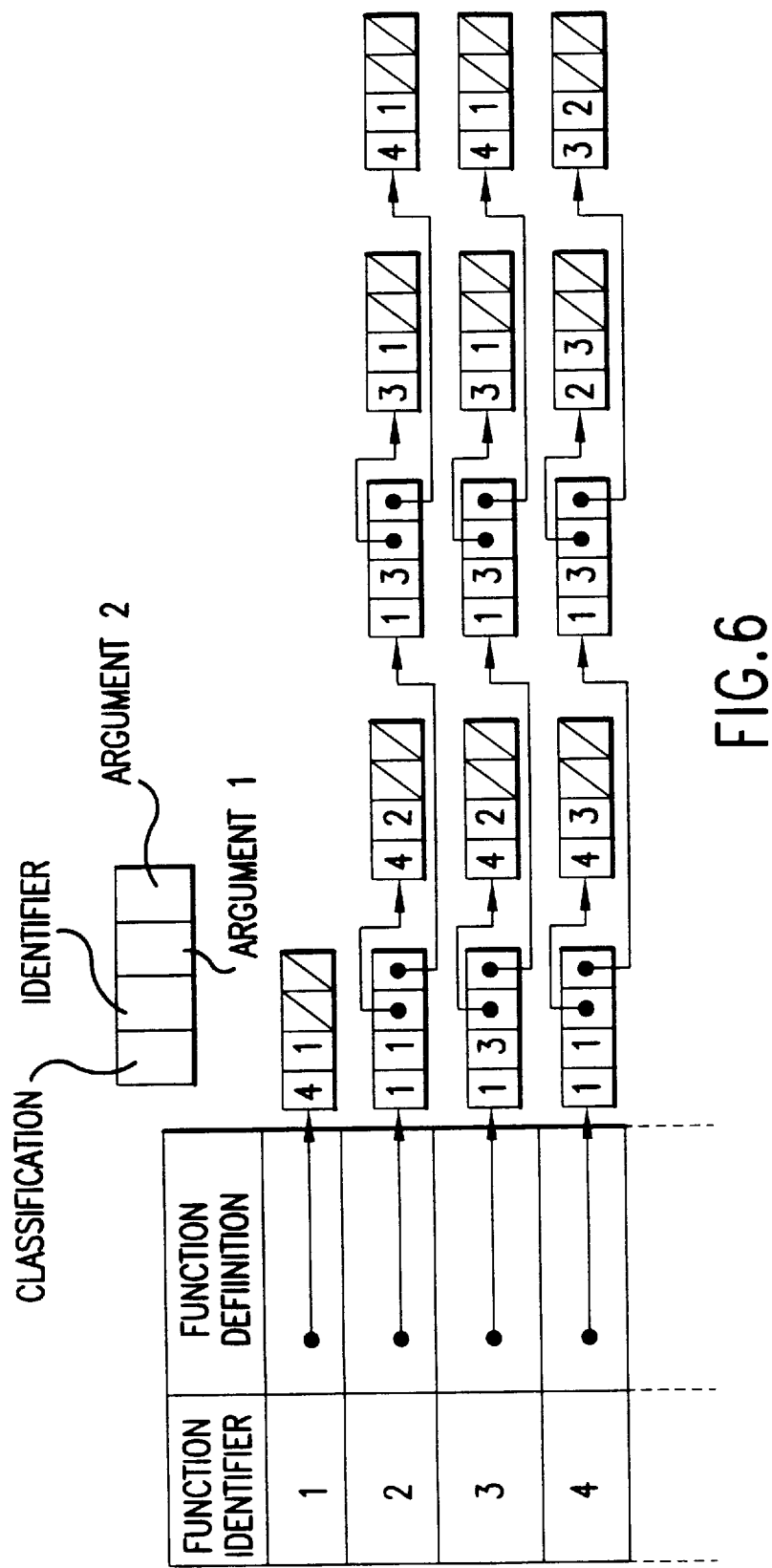
FIG. 6 is a drawing showing the function definition table which is referenced from the load parameter table of the drawing program creating system.

FIG. 6 shows a function definition table expressing the contents of the function identifiers in FIG. 5.

The function definition table is composed of a function identifier field and a function definition field, as shown in the figure, where the function definition field points to the tree structure data expressing the equation of the function. The data structure (node) expressing the leaves of the tree structure has four fields. That is to say, it comprises a classification field expressing the classification of the field, an identifier field expressing the ID within the classification, and an argument 1 field and an argument 2 field expressing two nodes. The data structure of the nodes is a general structure expressing a two-branch tree and giving expression to the equation.

FIG. 7 shows the types of classification IDs which appear in the classification field of the nodes in FIG. 6, with classification ID "0" expressing a constant, classification ID "1" expressing a combining function, classification ID "2" expressing a definition function, classification ID "3" expressing an argument and classification ID "4" expressing an argument total.

For the constants, the node itself has a numerical value. The combining function expresses the algorithm which is fixed inside. As is shown by the definition examples in FIG. 8, the identifier "1" expresses addition, the identifier "2" expresses subtraction, the identifier "3" expresses multiplication, the identifier "4" expresses division, the identifier "5" expresses squaring, and the identifier "6" expresses taking the square root.

The definition function points to the function definition table shown in FIG. 6. The argument has the meaning of acquiring a value with reference to the types of arguments of the argument field shown in FIG. 5. The argument coefficient has the meaning of acquiring a value from the coefficient values of the argument field shown in FIG. 5.

FIG. 9 is a table expressing the types of arguments which are referred to from the argument field of FIG. 5, where the type of argument is recorded as a fixed ID, with ID "1" meaning a constant, ID "2" meaning the number of paths, ID "3" meaning the number of characters, ID "4" meaning the size of the arrangement X and ID "5" meaning the size of the arrangement Y.

In this vein, the function definition table shown in FIG. 6 becomes the following when written with reference to the definitions of FIG. 7 through FIG. 9.

Result of function definition 1=argument coefficient 1,

Result of function definition 2=number of paths×argument coefficient 1+argument coefficient 2, Result of function definition 3=number of characters×argument coefficient 1×argument coefficient 2, Result of function definition 4=size of arrangement X×argument coefficient 1×size of arrangement Y×argument coefficient 2+argument coefficient 3.

Next, the actions of the drawing program creating system of the present embodiment will be described.

For the program creating system 1, when the input document data D which is created through execution of an application program, or the like, and the printer PR which is the output destination thereof are designated, the input controller 2 first sends a command to the load data management unit 5 so as to acquire the load parameters of the printer PR which has been designated. When the load data management unit 5 acquires the load parameters of the printer PR, the input controller 2 starts the page description program creating process unit 3. The page description program creating process unit 3 which has been started acquires the input document data D from the input controller 2 and accomplishes a process that creates a page description program expressing the input document data D. In this program creating process, the load parameters for the created commands are acquired from the load data management unit 5, and the load values are calculated for the case wherein input document data and the commands created using the arguments for the created commands are processed by the printer PR. The calculation equation for the load values is acquired from the load data management unit 5 as shown in FIG. 5 through FIG. 9.

In the load data management unit 5, these data items are managed for each command, and the load coefficient string is given by the information (number of paths, surface area of the raster, and the like) which is obtained when the program creating process unit 3 creates the commands from the input document data D. Furthermore, the page description language program created by the program creating process unit 3 is sent to the output controller 4, and in addition the load values which have been calculated are sent to the load data compiling unit 6.

In the output controller 4, the page description language program which was created and the load values which the load data compiling unit 6 compiles and manages are output to the printer PR as an output program BP.

Figure 10:
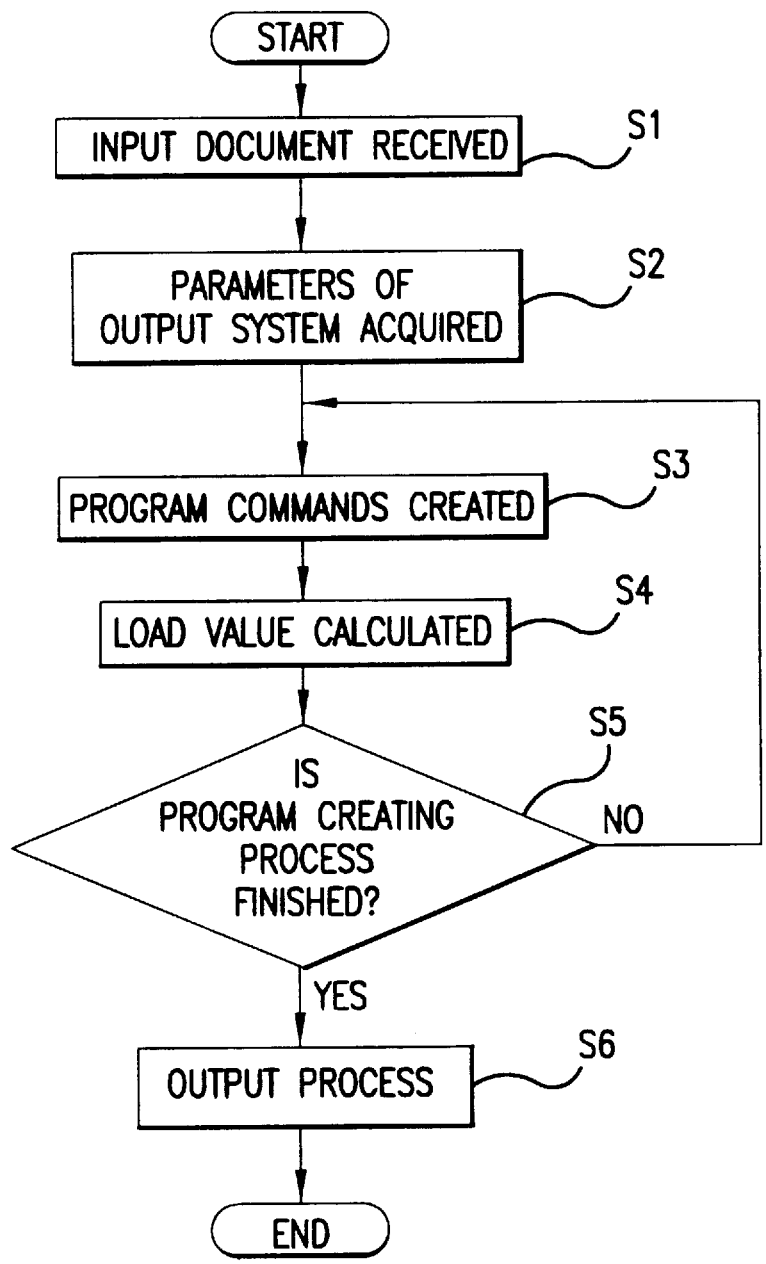
FIG. 10 is a flowchart showing the process flows of the drawing program creating system according to the first embodiment of the present invention.

FIG. 10 shows the flow of the creating processes of a series of drawing programs (page description programs) in the drawing program creating process system 1. The drawing program creating process will be described with reference to this flowchart.

First, the input controller 2 receives the input document data D through a printing command or the like (step S1). Then, the parameters of the load values required in the process of the designated printer PR are acquired (step S2). Following this, the page description program creating process unit 3 conducts a program creating process which creates the page description program commands from the input document data D (step S3). Furthermore, the load values of the created commands are calculated (step S4) and the drawing program in which are embedded the load values which have been calculated in the created program is sent to the output controller 4.

Next, a determination is made as to whether or not the page description program creating process unit 3 has finished the page description program creating process with respect to the input document data D (step S5). If the creating process of the page description program has not been finished, then the flowchart returns to step S3 and the process of creating the next command of the page description language program is repeatedly executed.

When the result of the determination in step S5 is that the creating process of the page description language program has been finished, the program final output processes such as closing the block are accomplished, and the series of processes is concluded (step S6).

Figure 11:
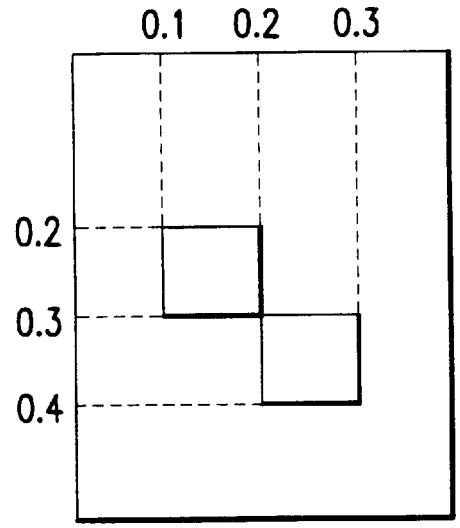
FIG. 11 is a drawing showing a program example in the first embodiment of the present invention.

FIG. 11 shows one example of the drawing program which is output on the basis of the first embodiment. In this drawing program, load values which are required in drawing and drawing commands which express two quadrilaterals are output through the extended Interpress commands, as described above with reference to FIG. 6. The numerical values which express the type of load values of the load value body are defined as 0: process time, 1: memory capacity, 2: compression processor process time, 3: color conversion hardware process time, and so forth. In this drawing program, the process time of the printer indicated by "0" is inside the load value body. Consequently, prior to the body relating to the page contents, the process time is described as the load value 1.82.

The equation which calculates the load value is shown in FIG. 5 through FIG. 9. When load value for the various commands that create one of the quadrilaterals is calculated, the values are 0.01 for MOVETO, 0.02 for LINETO, and the number of paths (4)×0.2+0.02=0.82 at MASKSTROKE, resulting in a total of 0.91 because there are 4 LINETO commands. Furthermore, the load value of the commands which create the other quadrilateral is also 0.91, and consequently, the load value of the page is 1.82.

In a printer PR which receives this kind of drawing program, it is possible to easily accomplish scheduling on the basis of the load values. For example, if the two quadrilaterals are drawn in parallel, it is possible to cut in half to 0.91 the program execution time in the successive process, which was 1.82 originally.

That is to say, for the drawing program which was created, the load which processes the page description program is indicated in this program itself. It is therefore possible to easily accomplish optimization by taking into consideration the load distribution without conducting a preprocess for the program by using the load data on the printer side.

In the above-described embodiment, a description was provided of the process time load. However, it is also possible to output other load values. An example will now be described wherein data expressing the memory capacity of the printer being used is output on the basis of the extended Interpress language.

In this case, the parameter table of the load values shown in FIG. 5 is prepared for each type of load value because different parameters result for each type of load value. In addition, because the data groups indicated by the function definition table of FIG. 6, the classification ID table of FIG. 7 and the combining function table of FIG. 8 are independent of the types of load values, it is possible for these to be shared even though the types of load values differ. The types of arguments indicated in FIG. 9 also are independent of the types of load values, and, consequently, it is possible for these to be shared also even though the types of load values differ.

Figure 12:
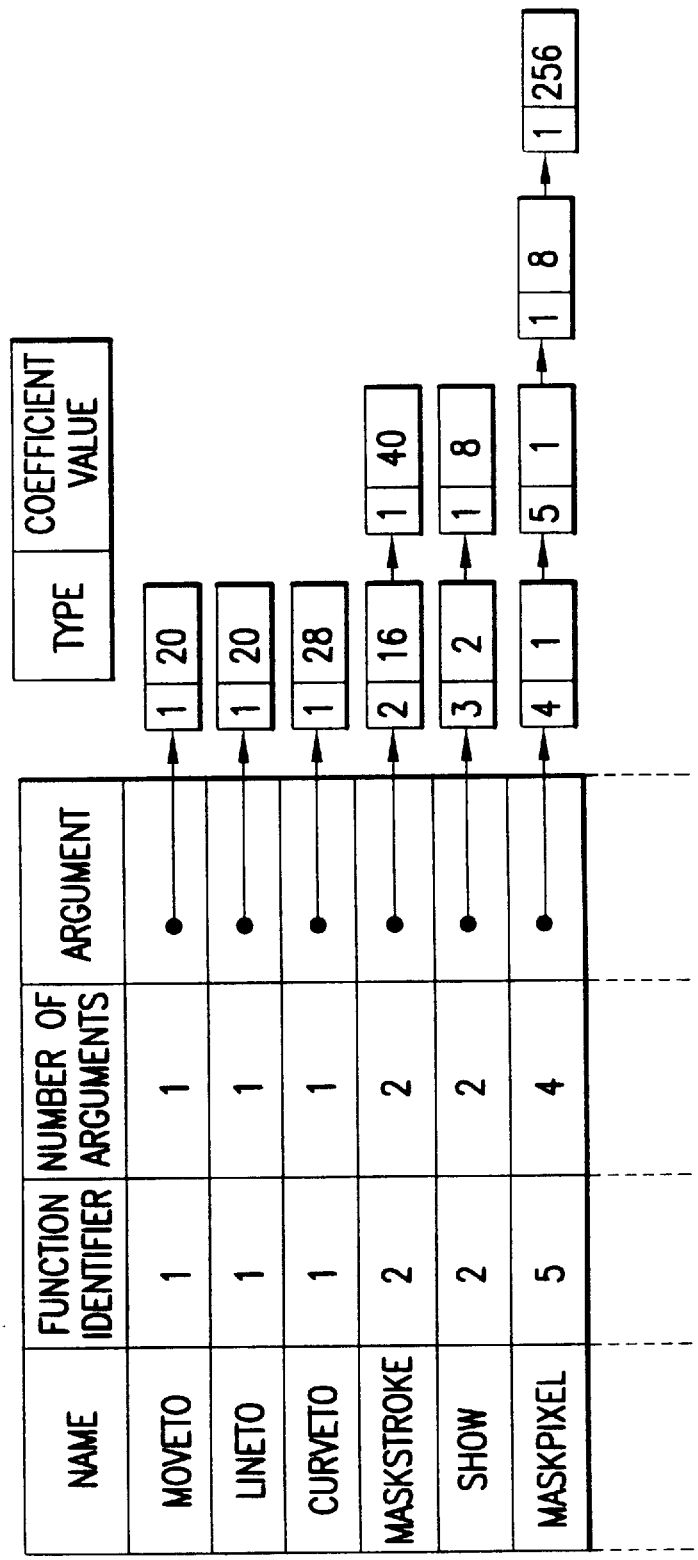
FIG. 12 is a drawing showing another example of the load parameter table holding the load parameters for each command of the drawing program creating system.
Figure 13:
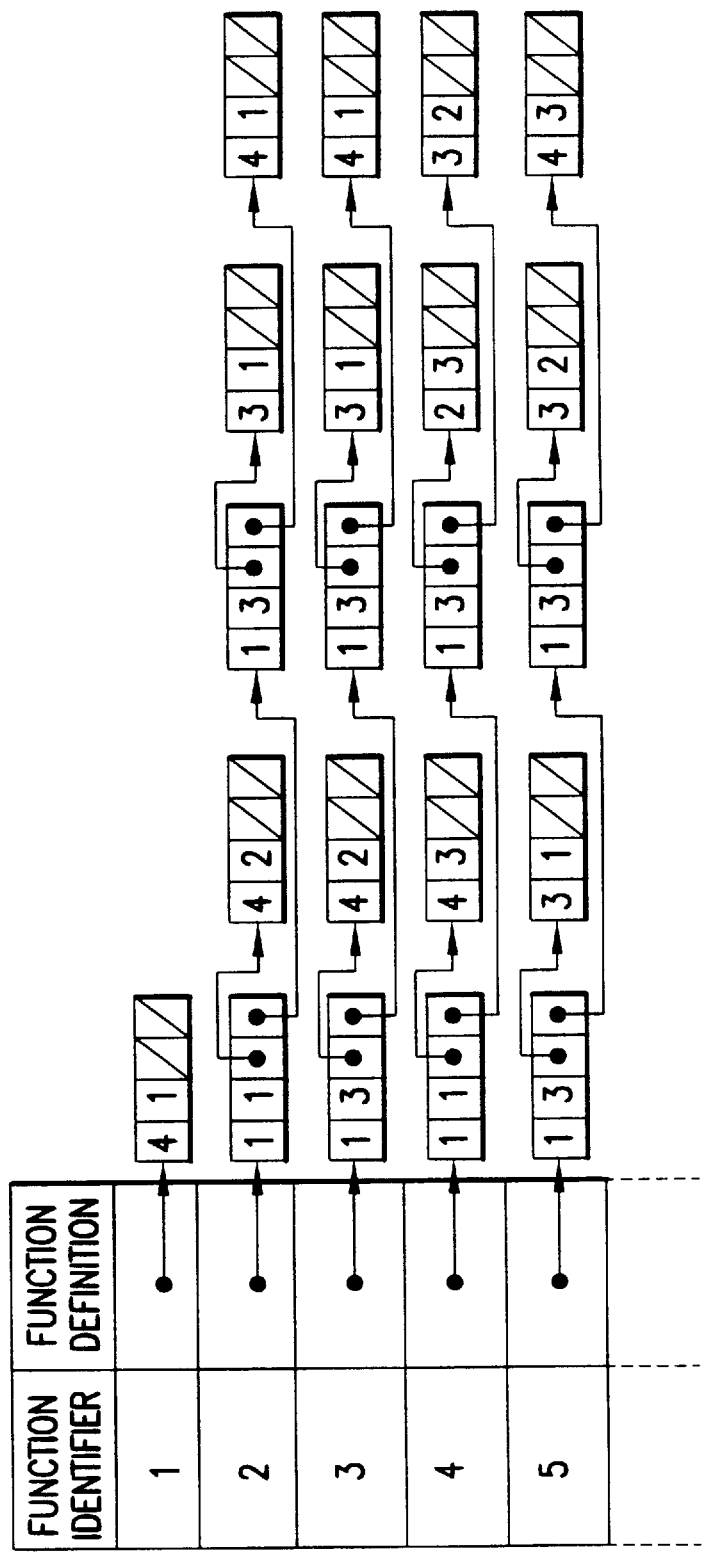
FIG. 13 is a drawing showing another example of the function definition table which is referenced from the load parameter table of the drawing program creating system.

Accordingly, when the parameter table shown in FIG. 5 is altered as shown in FIG. 12, and the function table of FIG. 6 is appended as shown in FIG. 13, calculations for memory capacity are more easily performed. From FIG. 12 and FIG. 13, the calculation equations for each command are as follows.

Results of MOVETO, LINETO and CURVETO= argument coefficient 1,

Result of STROKEPATH=number of paths×argument coefficient 1+argument coefficient 2, Result of SHOW=number of characters×argument coefficient 1+argument coefficient 2, Result of MASKPIXEL=size of arrangement X×size of arrangement Y×argument coefficient 3.

Figure 14:
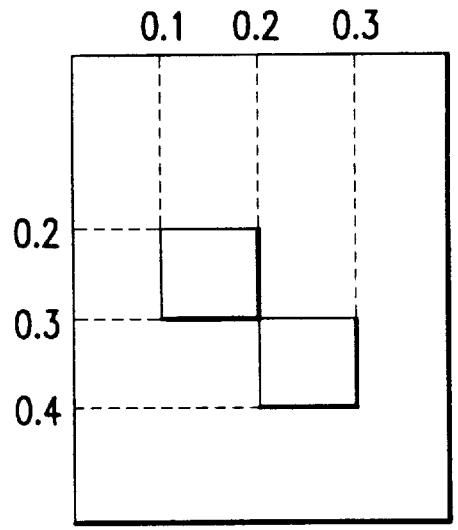
FIG. 14 is a drawing showing another program example in the first embodiment of the present invention.

FIG. 14 shows one example of the drawing program when the load value is taken to be the memory capacity required by the printer.

As shown in FIG. 3, the drawing commands which express two quadrilaterals and the load values necessary for the drawings are output one at a time for each quadrilateral (process unit) through extended Interpress commands. The equations which calculate the load values are as shown in FIG. 12 and FIG. 13. When the load values for the commands that form one quadrilateral are calculated, MOVETO is 20, LINETO is 20, MASKSTROKE is the number of paths (4)×16+40=104, resulting in a total of 204 because there are four LINETO commands. The load value for the commands which form the other quadrilateral is also 204, so the load value of this page is a total of 408.

On the printer side, it is possible to easily accomplish scheduling on the basis of the load value. And when the memory capacity is at least 408, it is possible to execute the process swiftly by drawing the two quadrilaterals in parallel.

In the drawing program which is created in this manner, the memory capacity of the printer which processes the page description program is indicated as load data, and optimization can be easily accomplished which takes into consideration the memory capacity distribution without conducting a pre-process on the program through the use of the load data on the printer side.

The above explanations regarded the memory capacity and process time of the printer, but naturally it is also possible to express parameters that express other loads using the above-described method.

Next, as a second embodiment of the present invention, a program creating system will be described which outputs load values to the drawing program by calculating the load value when the drawing commands of the page description language program are created, using a fundamental principle of program creation which accomplishes processes while simultaneously embedding printer load values in the page description program.

Figure 15:
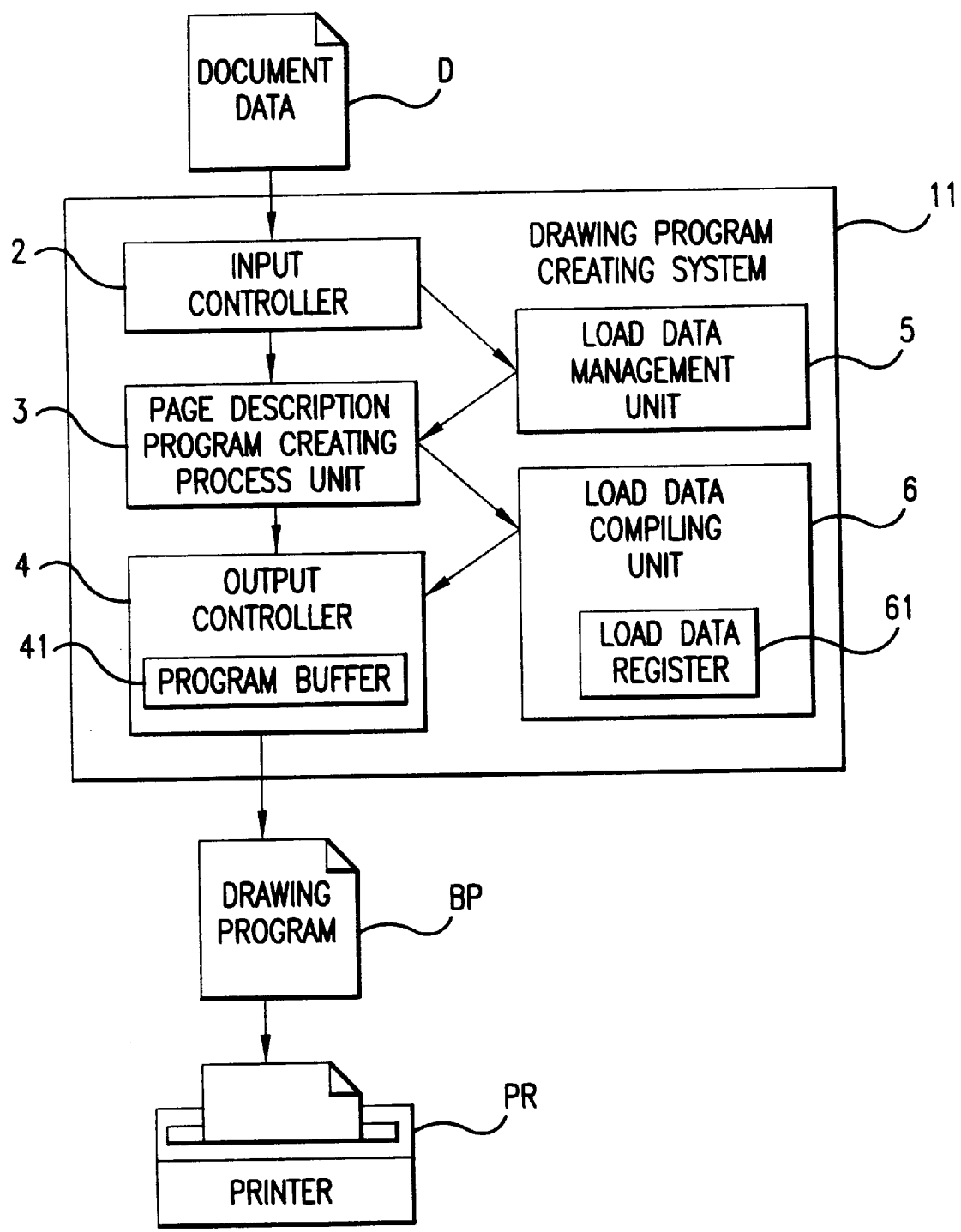
FIG. 15 is a drawing showing the composition of the major components of a drawing program creating system according to a second embodiment of the present invention.

FIG. 15 shows the primary components of a program creating system 11 according to the second embodiment. The same symbols are attached to components which are the same as in the above-described first embodiment.

As shown in this figure, the drawing program creating system 11 of the present embodiment differs from the first embodiment shown in FIG. 4 in that a load data register 61 is provided in the load data compiling unit 6, with a program buffer 41 provided in the output controller 4.

Figure 16:
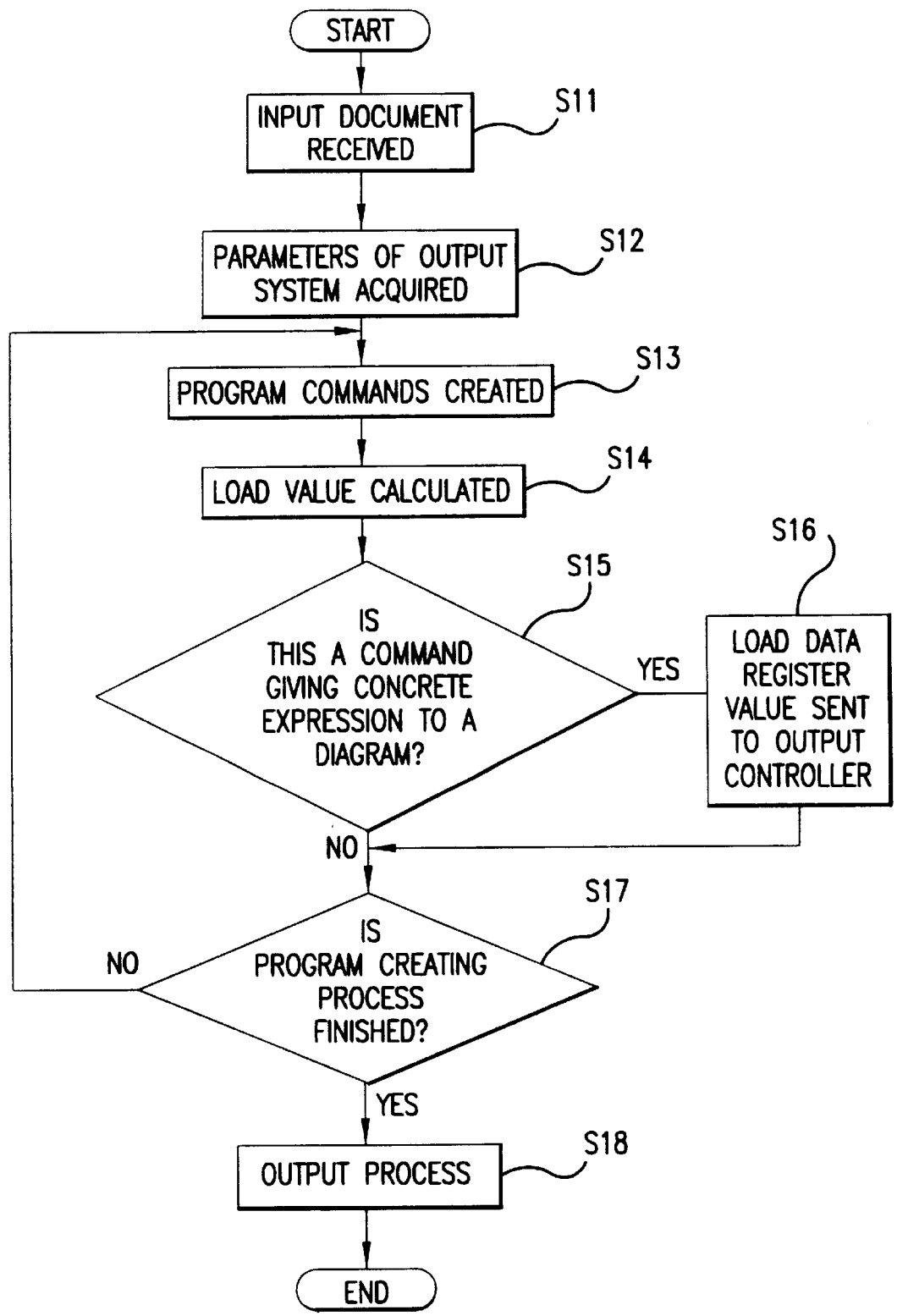
FIG. 16 is a flowchart showing the flow of the series of processes of the drawing program creating system according to the second embodiment of the present invention.

FIG. 16 shows the flow of the series of creating processes for drawing programs in the drawing program creating process system 11. The creating processes of the drawing program will be described with reference to the flowchart in this figure.

From step S11 through step S14, the processes are the same as those from step S1 through step S4 shown in FIG. 10. However, the commands which the page description program creating process unit 3 creates are sent to the output controller 4. In addition, the load values which are calculated are not sent to the output controller 4, but are added to the load data register 61 of the load data compiling unit 6.

In the determination process in step S15, a determination is made as to whether or not the command created in step S13 is a command which gives concrete expression to a diagram (e.g., MASKSTROKE, SHOW, MASKPIXEL or the like). When the command gives concrete expression to a diagram, the load value which is added and held in the load data register 61 is sent to the output controller 4, as shown in step S16, and the register values of this register 61 are cleared. Furthermore, in the output controller 4, the drawing program is output to the printer PR with the commands created to that point as a new block and the load values which have been calculated as the load values of the block.

Next, in step S17, a determination is made as to whether or not the creating process of the page description program has been finished with respect to the input document data D. When the creating process of the page description program has not been finished, the flowchart returns to step S13 and the process of creating the next command of the page description program is executed. On the other hand, when the result of the determination in step S17 is that the creating process of the page description program has been finished, the program final output processes (step S18), such as closing the block are accomplished, and the series of processes is concluded.

In the above-described second embodiment also, the same results can be obtained as in the above-described first embodiment. However, because a process load value is created for each drawing command, it is possible to disperse the load easily even in cases wherein parallel processing is accomplished for each drawing command.

In the above-described second embodiment, it is also possible to output the load value data of the entire page by accumulating the load values and programs which have been output to this point in the program buffer 41 using the output controller 4, totaling the load values which have been calculated, and outputting the load value data for the entire page each time a page is output, and thereafter outputting the load values and the program accumulated in the program buffer 41.

In addition, it would also be possible to output the data expressing the load of the processes of the entire input document data D by accumulating the load values and programs which have been output to this point in the program buffer 41 using the output controller 4, totaling the load value which have been calculated and outputting the load values of the entire document, and thereafter outputting the load values and the programs which have been accumulated in the program buffer 41.

Next, as a third embodiment of the present invention, a drawing program creating system will be described which totals the load values for each category to which the commands belong in the page description language program which has been created, and outputs the load values to the page description program.

The page description language has a plurality of drawing elements with differing processes. With Interpress, these can be classified into drawing elements such as drawing a line (e.g., MASKSTROKE), painting a surface (e.g., MASKFILL), drawing a character (e.g., SHOW), placing a raster (e.g., MASKPIXEL), or the like. There are also commands which belong to classifications other than the commands shown in this example. But in the present embodiment, a system will be described which totals the load values for each drawing element to which the commands shown in the example belong.

Figure 17:
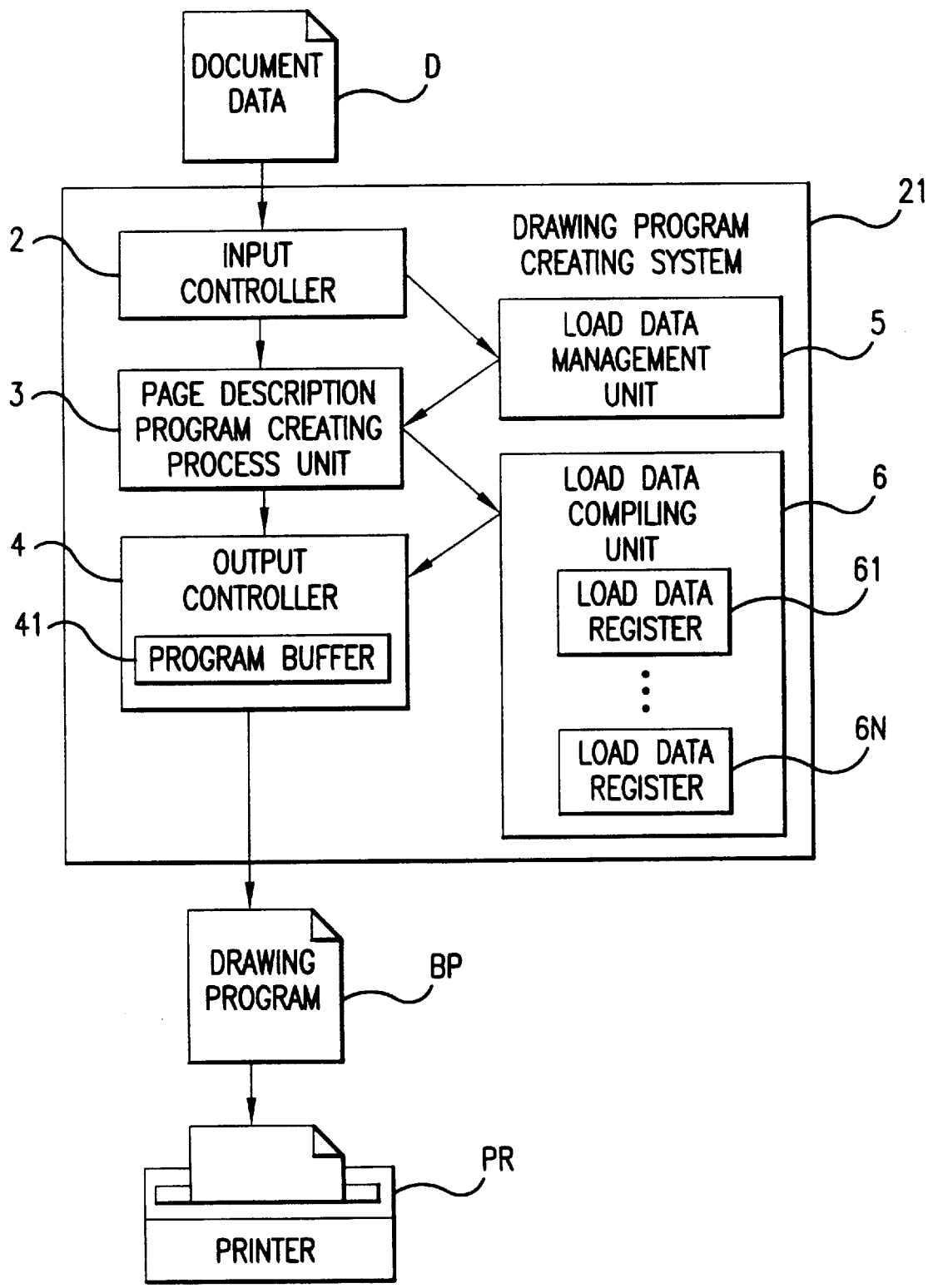
FIG. 17 is a drawing showing the composition of the major components of a drawing program creating system according to a third embodiment of the present invention.

FIG. 17 shows the composition of the primary components of a drawing program creating system 21 according to the third embodiment of the present invention. Components which are the same as in the above-described first and second embodiments are labeled with the same symbols as in the above embodiments.

As shown in this figure, the drawing program creating system 21 of the third embodiment differs from the program creating system 11 of the second embodiment shown in FIG. 15 in that a plurality of load data registers 61 to 6N differentiated by category have been provided in the load data compiling unit.

Figure 18:
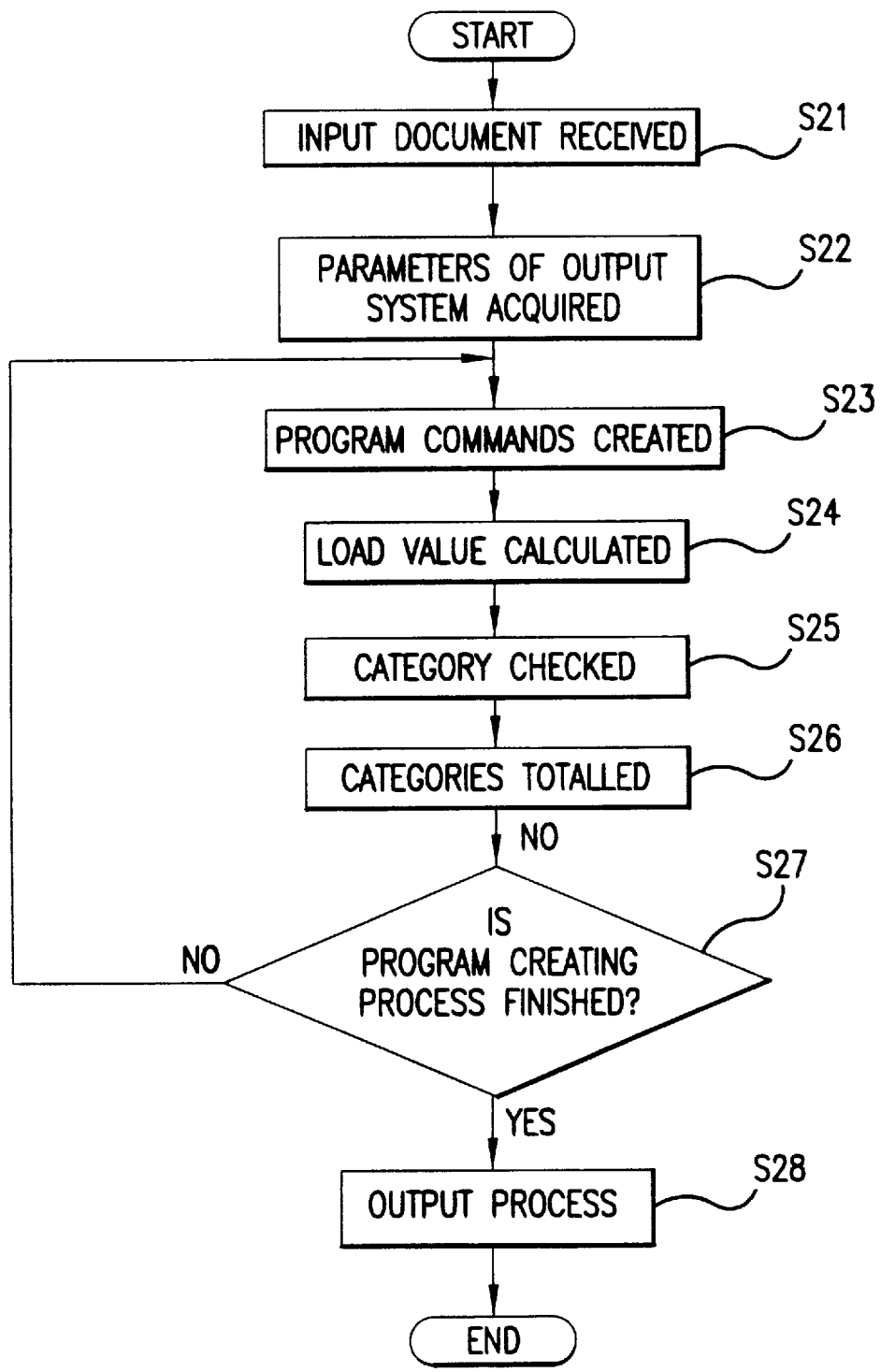
FIG. 18 is a flowchart showing the flow of the series of processes of the drawing program creating system according to the third embodiment of the present invention.

FIG. 18 shows the flow of the series of creating processes for drawing programs in the drawing program creating process system 21 of the present embodiment. The creating processes of the drawing program will now be described with reference to the flowchart in this figure.

From step S21 through step S24, the processes are the same as those from step S1 through step S4 shown in FIG. 10. However, the commands which have been created are sent to the output controller 4 and are stored in the program buffer 41.

Furthermore, in step S25, the category to which the created command belongs is acquired by searching the classification table shown in FIG. 19. The totaling of the load values for each category, as shown in step S26, is conducted by selecting the load data registers 61 to 6N on the basis of the value which was acquired in step S25.

Next, as shown in step S27, a determination is made as to whether or not the creating process of the page description program has been finished with respect to the input document data D. If the creating process of the page description program has not been finished, then the flowchart returns to step S23 and the process of creating the next command of the page description program is executed.

On the other hand, if the result of the determination in step S27 is that the creating process of the page description program has been finished, then, as shown in step S28, the load values which have been totaled in the load registers 61 through 6N are output and the program stored in the program buffer 41 is performed, thus concluding the series of processes.

In this way, with the present embodiment, it is possible, in addition to the results of the above-described embodiments, to easily accomplish load distribution when conducting parallel processes for each category, because the process load values are created for each command category.

In the third embodiment, it is also possible to output the load value data for each category of the entire page by using the output controller 4 for outputting the program which has been accumulated in the program buffer 41 after outputting the load values for each category of the page as a whole each time a page is output.

In addition, it is also possible to output the data expressing the load of the processes of the input document as a whole by using the output controller 4 for outputting the program which has been accumulated in the program buffer 41 after outputting the load values for each category of the whole after all of the program creating processes have been concluded.

Next, as a fourth embodiment of the present invention, a drawing program creating system will be described which outputs load values to the page description program after totaling the load values for each single diagram element of the input document data.

With a single diagram element of the input document data and a signal command of the page description language, the page description language will generally be more detailed. Accordingly, even if data expressing one diagram is taken in the input document data, the result will be divided into a plurality of page description language commands when the data is converted to a page description language program. For example, when the input document data is "paint in red the interior of the circle of radius 20 centered at the point (100,100), and make the circumference of the circle a black line of thickness 2", the data is converted to the contents, "(1) Create a path expressing a circle of radius 20 centered at the point (100,100). (2) Store the path. (3) Set red. (4) Paint the interior of the path. (5) Recover the stored path. (6) Set black. (7) Set a line width of 2. (8) Draw a line along the path." Although the data in the input document data was for one diagram, it was divided into eight commands in the page description language.

Figure 20:
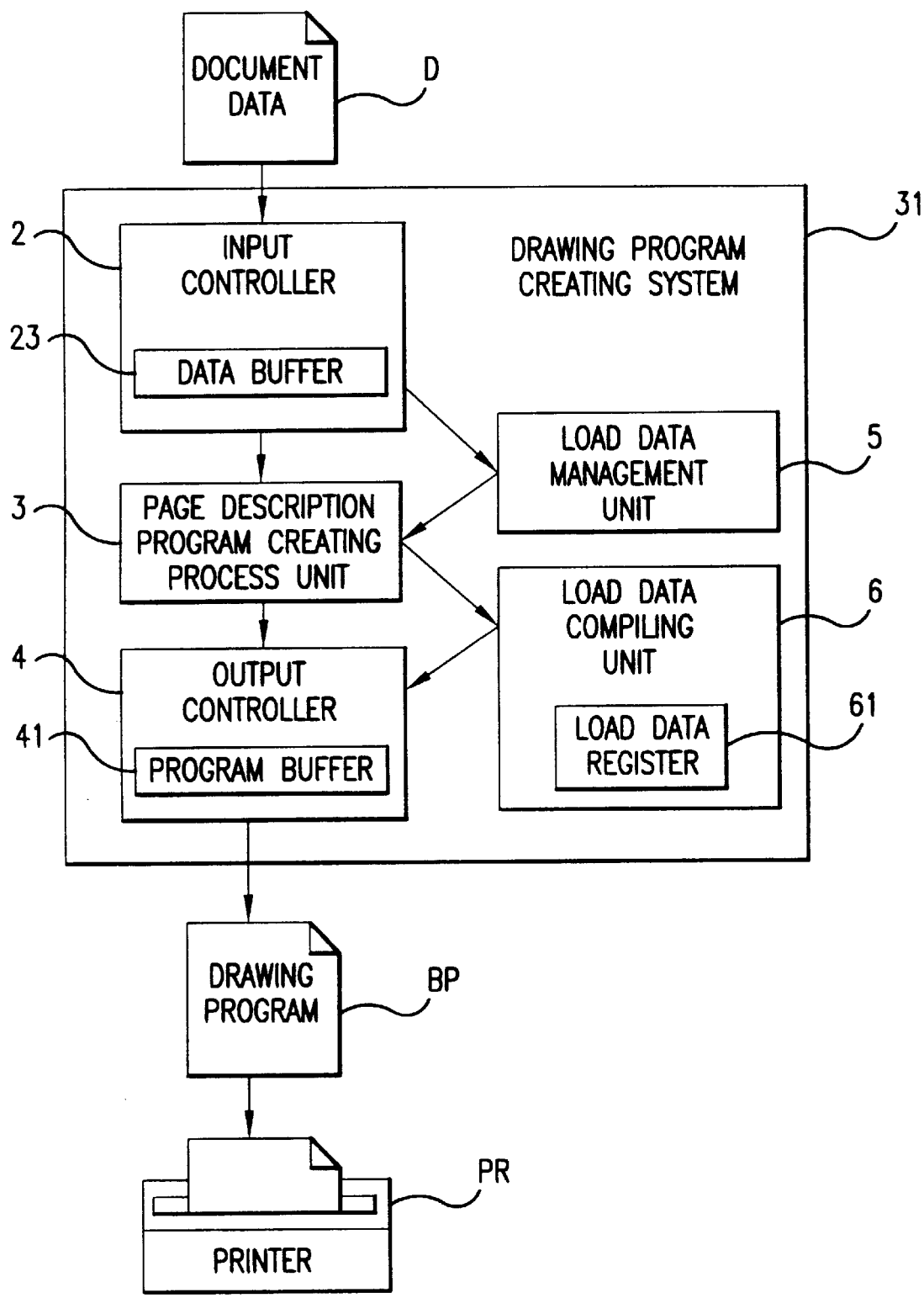
FIG. 20 is a drawing showing the composition of the major components of a drawing program creating system according to a fourth embodiment of the present invention.

FIG. 20 shows the composition of the primary components of a drawing program creating system 31 according to the fourth embodiment of the present invention. Components which are the same as in the above-described first through third embodiments are labeled with the same symbols as in the above embodiments.

As shown in this figure, the drawing program creating system 31 of the fourth embodiment differs from the program creating system 11 of the second embodiment shown in FIG. 15 in that a data buffer 23 is provided in the input controller 2.

Figure 21:
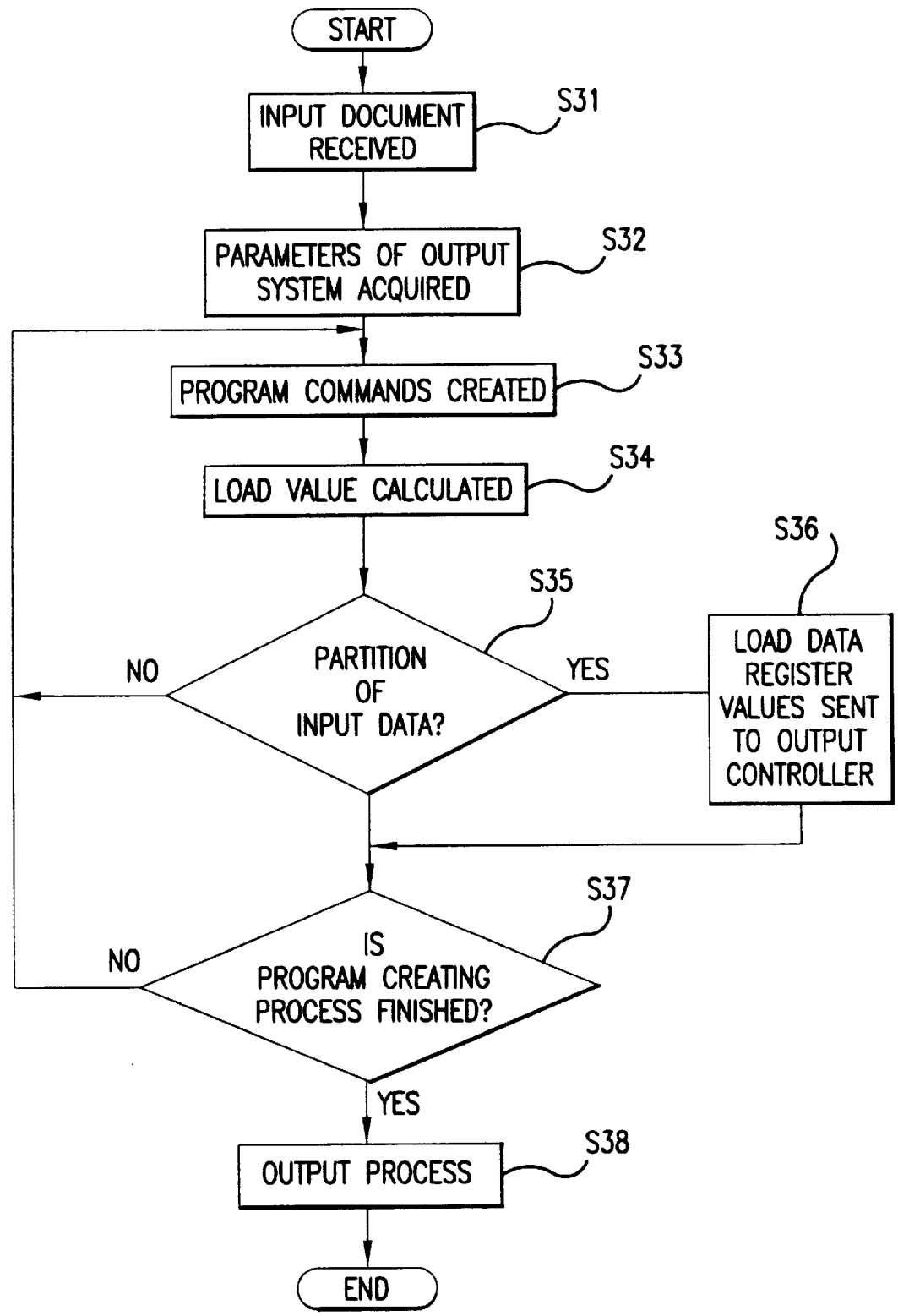
FIG. 21 is a flowchart showing the flow of the series of processes of the drawing program creating system according to the fourth embodiment of the present invention.

FIG. 21 shows the flow of the series of creating processes for drawing programs in the drawing program creating process system 31 of the present embodiment. The creating processes of the drawing program will be described with reference to the flowchart in this figure.

From step S31 through step S34, the processes are the same as those from step S1 through step S4 shown in FIG. 10. However, the commands which have been created are sent to the output controller 4, and the calculated load values are not sent to the output controller 4, but rather are added to the load data register 61. In addition, one of the diagram elements in the input document data D is stored in the data buffer 23 of the input controller 2.

In the determination process of step S35, a determination is made as to whether or not the data is a partition of the input data D on the basis of whether or not the data buffer 23 which holds the data of the diagram element units is empty. If the data is a partition of the input data, as in step S36 the load values which have been totaled in the load data register 61 are sent to the output controller 4 and the register values are cleared. Furthermore, in the output controller, the commands which have been created to that point are output as a new block, the load values which have been calculated are output as the load values of the block, and the flowchart moves to step S37.

On the other hand, when the data is not a partition of the input data, the flowchart returns to step S33 and performs the creating process of the next page description program.

Next, in step S37, a determination is made as to whether or not the creating process of the page description program has been finished with respect to the input document data D. If the creating process of the page description program has not been finished, then the flowchart returns to step S33 and the process of creating the next command of the page description program is executed.

On the other hand, if the result of the determination in step S37 is that the creating process of the page description program has been finished, then, in step S38, the program final output processes such as closing the block are accomplished, and the series of processes is concluded.

In this way, in the present embodiment the same results can be obtained as in the above-described first embodiment. In particular, because the process load values are created in units that process one diagram element of the input document data, it is possible to accomplish parallel processing with the original diagram units.

In the fourth embodiment, it is also possible to output the load value data of the entire page by accumulating the load values and programs which have been output to this point in the program buffer 41 using the output controller 4, totaling the load values which have been calculated, and outputting the load value data for the entire page each time a page is output, and outputting the load values and the program accumulated in the program buffer.

In addition, it would also be possible to output the data expressing the load of the processes of the entire input document data D by accumulating the load values and programs which have been output to this point in the program buffer 41 using the output controller 4, totaling the load value which have been calculated and outputting the load values of the entire document.

Next, as a fifth embodiment of the present invention, a drawing program creating system will be described which acquires the load parameters of the printer from the printer PR.

Figure 22:
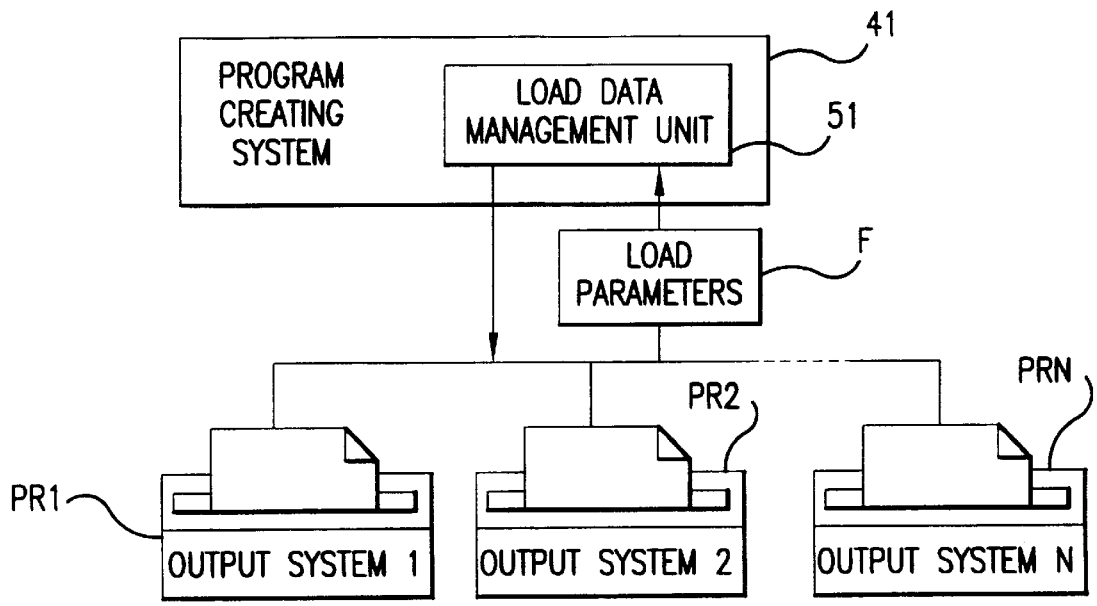
FIG. 22 is a drawing showing the composition of the major components of a drawing program creating system according to a fifth embodiment of the present invention.

FIG. 22 shows the composition of the primary components of a drawing program creating system 41 according to the fifth embodiment of the present invention.

As shown in this figure, the drawing program creating system 41 of the fifth embodiment differs from the drawing program creating system 1 of the first embodiment, shown in FIG. 4, in that a load data management unit 51 communicates with the printers PR1 to PRN, and acquires load parameters F from the printers PR1 to PRN which are the output objective.

While an input controller 2, a page description program creating process unit 3, an input and output controller 4, and a load data compiling unit 6 are present in the drawing program creating system 41 of the present embodiment, as in the first embodiment, these are omitted from the drawing shown in FIG. 22.

Figure 23:
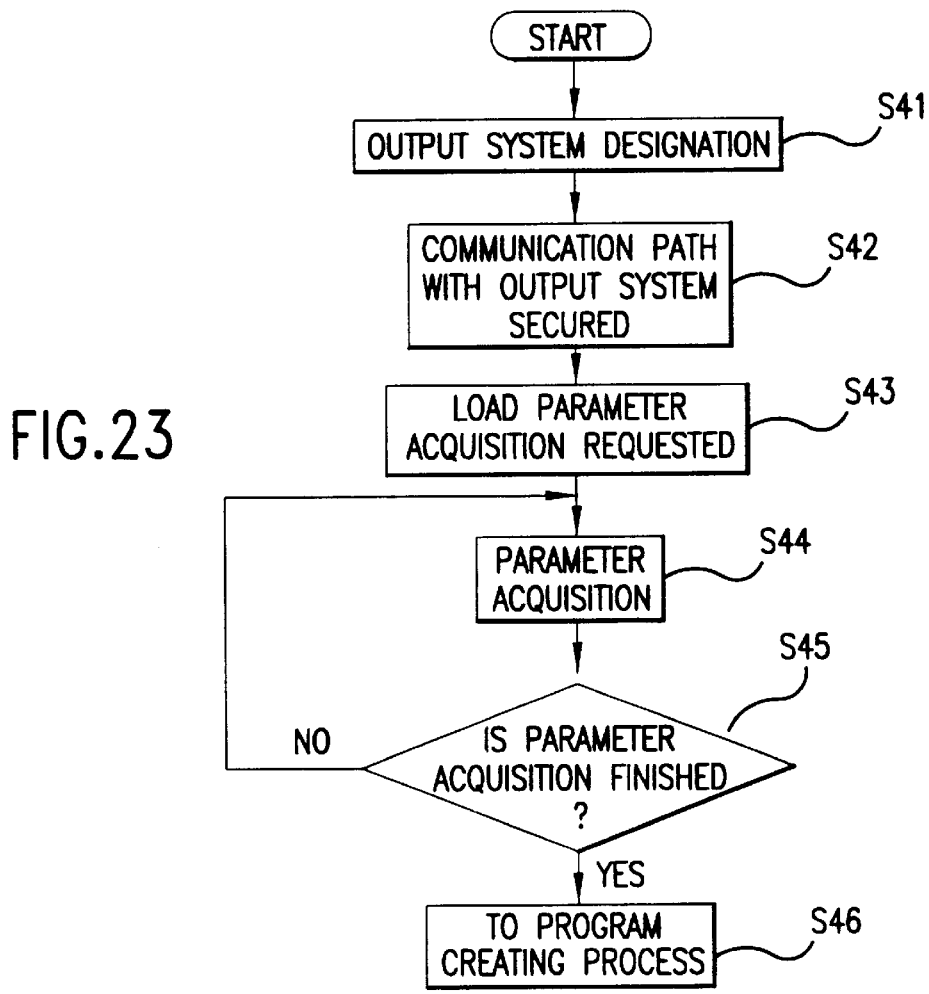
FIG. 23 is a flowchart showing the flow of the series of processes of the drawing program creating system according to the fifth embodiment of the present invention.

FIG. 23 shows the flow of the series of load parameter acquiring processes which are accomplished by the load data management unit 51 of the drawing program creating process system 41.

First, a printer designation is accomplished (step S41), and a communication path with the designated printer is secured (step S42). The printer which is the output objective is designated (step S41) when an output request for the input document data has been sent. A parameter acquisition request is next sent to the printer which is the output objective (step S43). Through this, the printer which received the request sends the data of the load parameters one by one over the communication path. These load parameters which have been sent are received by the load data management unit 51 (step S44), Furthermore, a determination is made (step S45) as to whether or not all of the load parameters have been acquired. If the determination is that acquisition is not yet completed, then the flowchart returns to step S44 and the next load parameter is acquired. On the other hand, if the determination is that all of the load parameters have been acquired, then the flowchart moves (step S46) to the drawing program creating process.

In the present embodiment, in addition to the results of the above-described embodiments, it is possible to acquire or define the load data for each printer. Through this, it is possible to create load values employing the properties of each printer.

Figure 24:
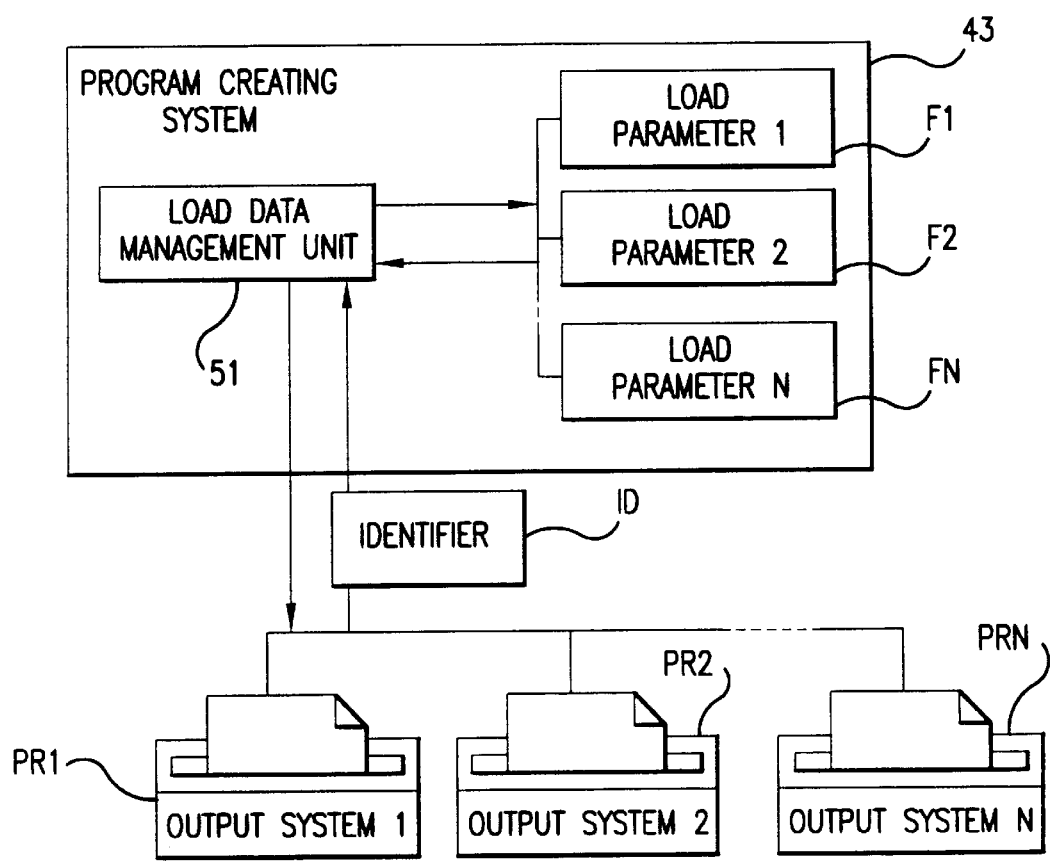
FIG. 24 is a drawing showing the composition of the major components of another drawing program creating system according to the fifth embodiment of the present invention.
Figure 25:
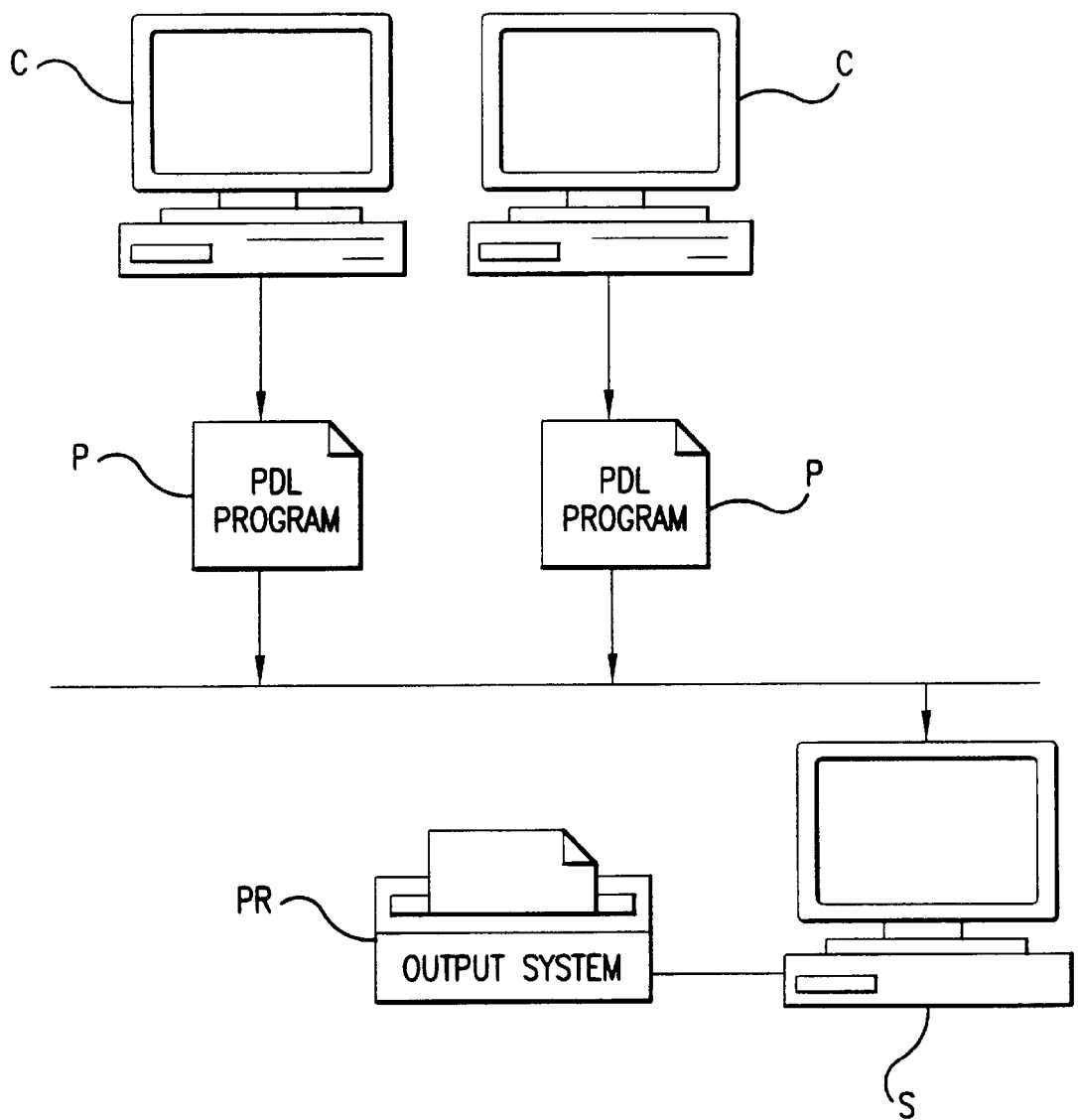
FIG. 25 is a drawing showing one example of the composition of a printer system.
Figure 26:
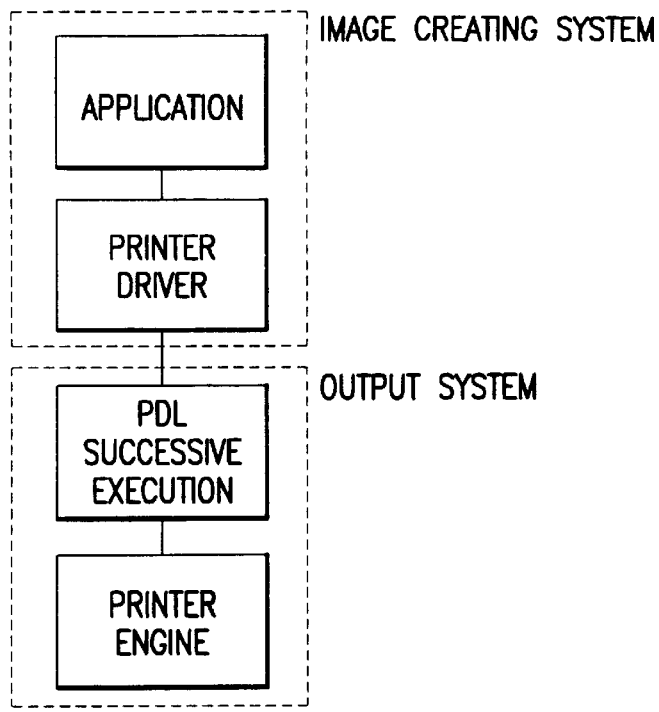
FIG. 26 is a drawing explaining the successive processes of a page description language program.
Figure 27:
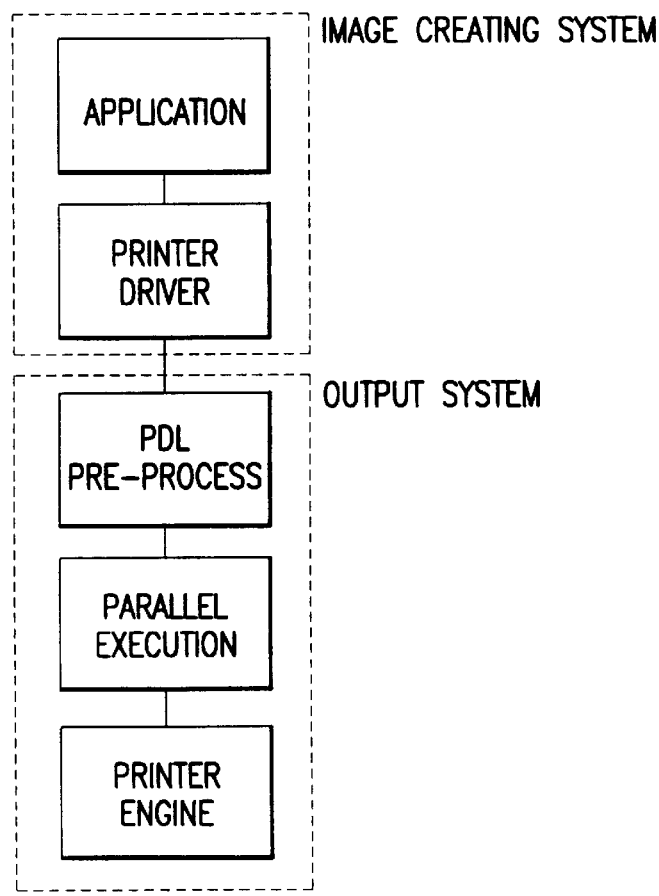
FIG. 27 is a drawing explaining the pre-process and parallel processes of a page description language program.

An alternative drawing program creating system 43 is shown in FIG. 24. As shown in this figure, the data of the load parameters F1 to FN are held beforehand on the program creating system 43 side, and the data which communicates with the printers PR1 to PRN is taken to be only the identifier (version and system ID and the like) ID designating the printer, thus making it possible to reduce the amount of communication.

As described above, the loads required in the processes of the page description language program are found beforehand for each particular process unit, and a drawing program in which these loads are embedded in the above program is created and output to the printer. Consequently, the loads which are applied to the processes of the page description language program are understood in advance on the printer side, making it possible to reduce unnecessary pre-processes by using the load information, and thus speeding up the output process.

Finally, it is also possible to create load values suitable for the printer by using parameters determined for each printer in the calculation of the load values. This way it becomes possible to achieve optimization in the printer and create an effective output process.

What is claimed is:

1. A drawing program creating system, comprising:
   conversion means for converting document data into commands of a page description language based on document data which has been input into the drawing program creating system;
   memory means for storing load parameters indicating the time needed by a printer for processing of commands;
   calculation means for calculating a load of the printer for a process unit which corresponds to a command based on the load parameters which are stored in the memory means; and
   program creation means for creating a drawing program that is processed by the printer from the commands which have been converted by the conversion means and the load which has been calculated by the calculation means.

2. A drawing program creating system, comprising:
   conversion means for converting document data into commands of a page description language on the basis of document data which has been input;
   memory means for storing load parameters indicating a memory capacity needed a printer for the processing of commands;
   calculation means for calculating a load of the printer for process units corresponding to the converted commands on the basis of the load parameters which are stored in the memory means; and,
   program creation means for creating a drawing program that is processed by the printer from the commands which have been converted by the conversion means and the load which has been calculated by the calculation means.

3. The drawing program creating system of claim 1, wherein the calculation means totals the loads which have already been calculated for each page that is to be drawn.

4. The drawing program creating system of claim 2, wherein the calculation means totals the loads which have already been calculated for each page that is to be drawn.

5. The drawing program creating system of claim 1, wherein the program creation means creates a program which describes a load of the printer which was calculated by the calculation means near the process unit corresponding to the load.

6. The drawing program creating system of claim 2, wherein the program creation means creates a program which describes a load of the printer which was calculated by the calculation means near the process unit corresponding to the load.

7. The drawing program creating system of claim 1, wherein the program creation means creates a program which describes a load of the printer which was calculated by the calculation means immediately before the process unit corresponding to the load.

8. The drawing program creating system of claim 2, wherein the program creation means creates a program which describes a load of the printer which was calculated by the calculation means immediately before the process unit corresponding to the load.

9. A drawing program creating system, comprising:
   conversion means for converting document data into commands of a page description language on the basis of document data which has been input;
   parameter acquiring means for acquiring from a printer load parameters indicating a time needed by the printer for processing each of the commands of the page description language;
   calculation means for calculating a load of the printer for each process unit corresponding to the commands on the basis of the load parameters which are acquired by the parameter acquiring means; and
   program creation means for creating a drawing program that is processed by the printer from the commands which have been converted by the conversion means and the load which has been calculated by the calculation means.

10. A drawing program creating system, comprising:
    conversion means for converting document data into commands of a page description language on the basis of document data which has been input;
    parameter acquiring means for acquiring from a printer load parameters indicating a memory capacity needed by the printer to process each command of the page description language;
    calculation means for calculating a load of the printer for each process unit corresponding to the commands on the basis of the load parameters which are acquired by the parameter acquiring means; and
    program creation means for creating a drawing program that is processed by the printer from the commands which have been converted by the conversion means and the load which has been calculated by the calculation means.

11. The drawing program creating system of claim 1, wherein the calculation means comprises a load buffer, and wherein the calculation means calculates the load for each command converted by the conversion means and sums all the calculated loads in the load buffer until a load for a drawing command is calculated, then outputs the sum of the loads to the program creation means and re-initializes the load buffer.

12. The drawing program creating system of claim 2, wherein the calculation means comprises a load buffer, and wherein the calculation means calculates the load for each command converted by the conversion means and sums all calculated loads in the load buffer until a load for a drawing command is calculated, then outputs the sum of the loads to the program creation means and re-initializes the load buffer.

13. The drawing program creating system of claim 1, wherein the calculation means comprises a plurality of load buffers, each load buffer corresponding to a type of drawing operation, and wherein the calculation means calculates the load for each command converted by the conversion means and sums the loads for each type of drawing operation in the corresponding load buffers until the loads for all drawing commands of a page have been calculated, then outputs the sums of the loads for each type of drawing operation to the program creation means and re-initializes the load buffers.

14. The drawing program creating system of claim 2, wherein the calculation means comprises a plurality of load buffers, each load buffer corresponding to a type of drawing operation, and wherein the calculation means calculates the load for each command converted by the conversion means and sums the loads for each type of drawing operation in the corresponding load buffers until the loads for all drawing commands of a page have been calculated, then outputs the sums of the loads for each type of drawing operation to the program creation means and re-initializes the load buffers.

15. The drawing program creating system of claim 1, wherein the calculation means comprises a load buffer, and wherein the calculation means calculates the load for each command converted by the conversion means and sums all calculated loads for a particular diagram element in the load buffer until all loads for the diagram element have been calculated, then outputs the sum of the loads to the program creation means and re-initializes the load buffer.

16. The drawing program creating system of claim 2, wherein the calculation means comprises a load buffer, and wherein the calculation means calculates the load for each command converted by the conversion means and sums all calculated loads for a particular diagram element in the load buffer until all loads for the diagram element have been calculated, then outputs the sum of the loads to the program creation means and re-initializes the load buffer.

17. A method of creating a drawing program for printing a document, comprising the steps of:

storing load parameters in a memory, the load parameters indicating a time required by a printer to process a printing command;

converting data representing the document into printing commands of a page description language;

calculating a load of the printer for each of the printing commands based on the load parameters stored in memory; and creating a drawing program for printing the document based on the printing commands and the calculated loads.

18. A method of creating a drawing program for printing a document, comprising the steps of:

storing load parameters in a memory, the load parameters indicating a memory capacity required by a printer to process a printing command;

converting data representing the document into printing commands of a page description language;

calculating a load of the printer for each of the printing commands based on the load parameters stored in memory; and creating a drawing program for printing the document based on the printing commands and the calculated loads.

\* \* \* \* \*